UNITED STATES PATENT OFFICE.

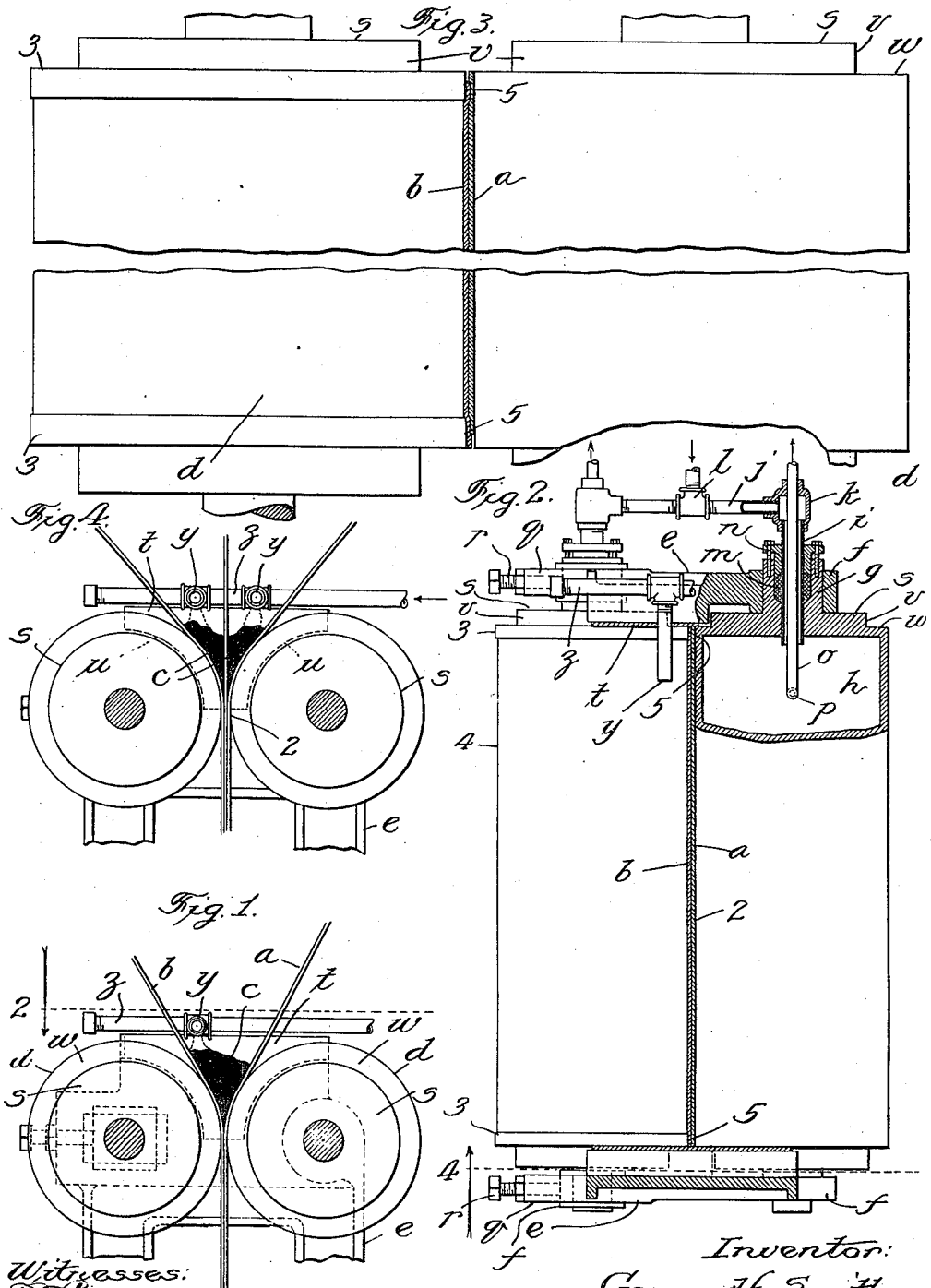

GEORGE H. SMITH, OF MILWAUKEE, WISCONSIN, ASSIGNOR TO H. W. JOHNS-MANVILLE COMPANY, OF MILWAUKEE, WISCONSIN, A CORPORATION OF NEW YORK.

SEALED-EDGED LAMINATED SHEET AND PROCESS OF MAKING THE SAME.

1,195,408.   Specification of Letters Patent.   Patented Aug. 22, 1916.

Application filed September 23, 1914. Serial No. 863,080.

*To all whom it may concern:*

Be it known that I, GEORGE H. SMITH, a citizen of the United States, and a resident of Milwaukee, in the county of Milwaukee and State of Wisconsin, have invented certain new and useful Improvements in Sealed-Edged Laminated Sheets and Processes of Making the Same; and I do hereby declare that the following is a full, clear, and exact description thereof, reference being had to the accompanying drawings, and to the letters of reference marked thereon, which form a part of this specification.

This invention relates to an improved process of making roofing paper or sheets of flexible fibrous material formed of a plurality of united layers or plies, or composition, whereby adhesive material in a plastic condition is interposed between the layers to be united, and pressure tending to press the sheets or plies together is applied progressively from end to end thereof, and in such a manner that the longitudinal, marginal portions of the layers are subjected to a greater degree of pressure than the portions of the layers located intermediate such longitudinal marginal portions, and whereby the longitudinal marginal portions are sealed, by preference, by means of such pressure and by being subjected to the action of heat during compression.

The principal object of the invention is to provide an improved process for making sheets formed of a plurality of layers of sheet material adhesively secured together, and an improved article of manufacture or sealed-edged sheet made in accordance with such improved process.

Other and further objects of the invention will appear from the following description and from an examination of the accompanying drawings which are made a part hereof.

The invention consists in the features, combinations, and details of construction of multi-layer sheets, and in the process of manufacturing sheets formed of a plurality of layers or plies herein described and claimed.

In the accompanying drawings, Figure 1 is a view in end elevation of a pair of compression rolls provided with means for introducing adhesive material between a plurality of layers or plies of sheet material to be operated upon and having a space between said rolls which is narrower at the opposite extremities of the rolls than at other points between the rolls; Fig. 2, a top or plan view of the apparatus or rolls shown in Fig. 1, with a portion of one of the rolls and a roll-supporting frame-work and steam and water conduits shown in horizontal section; Fig. 3, an enlarged top or plan view of the rolls shown in Figs. 1 and 2, with a portion of the rolls broken away and the supporting frame-work omitted; and Fig. 4, a view in end elevation of a pair of compression rolls similar to those shown in Figs. 1, 2 and 3, provided with means for introducing adhesive material between more than two layers or plies of sheet material.

In making a sheet of roofing paper or a sheet of flexible or fibrous material or composition sheet comprising a plurality of layers adhesively secured together, in accordance with my invention and improvements, I provide a plurality of plies or layers $a$ and $b$, of flexible, fibrous, or sheet material. The layer or ply $a$ may be of paper or similar fibrous or flexible material, and the layer or ply $b$ may be formed of fibrous asbestos, or the sheet which comprises a plurality of united plies or layers may be formed of any desired number of layers or plies of paper, fibrous asbestos, felt, or other suitable sheet material, fabric or composition, to be compressed and adhesively secured together in accordance with my improved process. A suitable supply of adhesive material $c$ is provided, which, by preference, is in the form of tar or tar and asphalt, or other similar or suitable adhesive material, which, in a plastic or liquid condition, is applied to the adjacent surfaces of the layers or plies to be adhesively secured together.

The layers or plies of sheet material are laid together and the end portions thereof are inserted between parallel, approximately cylindrical, compression rolls, such as rolls $d$, in such a manner that the inner adjacent surfaces of the layers or plies are so held in contact as to prevent the adhesive material from escaping from between the sheets or layers in a longitudinal direction or endwise of the layers to be united. (See Fig. 1.) The layers are stretched in a position to extend upward and outward at an incline, or in oblique relation to each other, in opposite directions from the point of convergence or contact of the layers or plies, so as to provide a V-shaped space between such layers or plies, adapted to admit the adhesive material which is introduced continuously between the layers simultaneously with the compressing of the layers together by the application of pressure progressively from end to end thereof. Pressure, by means of which the layers or plies are compressed together, is applied while the adhesive material, thus, by preference, continuously introduced between the layers or plies, is in a moist or plastic condition. The adhesive material and the layers or plies to be united are, by preference, subjected to a sufficiently high degree of heat to maintain the adhesive material in plastic condition during the application of such pressure. The longitudinal marginal portions of the layers are subjected to a greater degree of pressure, and are more closely and compactly compressed together than are the portions of the layers or sheets located intermediate such longitudinal marginal portions. This pressure on the longitudinal marginal portions of the layers to be united is sufficiently in excess of the pressure upon the portions of the layers located between such marginal portions to prevent the adhesive material from being squeezed or pressed outward laterally or protruding from between the longitudinal margins or edges of the layers or plies. The adhesive material is, in fact, pressed inward toward the longitudinal center of the sheet or layers during the process of uniting the same. The longitudinal marginal portions or edges of the sheet, or of the layers or plies of which the sheet is formed, are thus secured and tightly sealed together in such a manner that the adhesive material is prevented from being deposited upon and from escaping to or projecting beyond the exterior of the sheet. The layers or plies are also subjected to the action of heat sufficient to maintain the adhesive material in a plastic condition during compression. The heat is applied to the outside of the layers during the compression thereof, so that the adhesive material is caused to thoroughly permeate the material of which the layers or plies are formed. The marginal edges and the adhesive material between the tightly compressed longitudinal marginal portions or edges are thus caused to dry rapidly and the edges are tightly sealed together in such a manner that leakage or what is known as "weeping" or "bleeding" at the edges is prevented, and the sheet is rendered non-curling and is adapted to lie flat and straight at its marginal edges and throughout its entire area. The marginal edges of the sheet are not only even and straight and free from protruding particles, but the sheet thus formed of a plurality of united layers is of substantially the same thickness throughout its entire area, instead of being of greater thickness at the longitudinal margins, as is the case when the longitudinal marginal edges of the layers are subjected to only the same degree of pressure as the portions of the sheet located intermediate said longitudinal margins. The sheet being of substantially uniform thickness throughout, and having straight, tightly sealed, longitudinal edges, is free from crimps, waves, or undulations, and is adapted to roll up evenly and without injury and to lie flat throughout its entire area even after having been rolled up and unrolled and handled in the ordinary manner necessary in transporting and laying or utilizing the sheet material thus provided.

In making sheets formed of a plurality of layers or plies adhesively secured together, in accordance with my improved process and invention, the layers or plies, with the adhesive material in plastic condition therebetween, are passed between rotary compression and heating rolls $d$ of metal. Said rolls are journaled in a suitable supporting frame $e$, of any desired construction and having bearings $f$ in which the axles or journal portions of the rolls are adapted to rotate. The rolls, thus rotatively mounted in parallel relation to each other, are of hollow formation, so as to provide heating chambers $h$ therein, and a steam pipe $i$, which is connected with a suitable source of steam supply by means of a pipe or manifold $j$ and pipe connections $k$ and $l$, extends into the hollow journaled portion $g$ of each heating and compressing roll. The hollow, journaled portion is provided with a suitable packing $m$ and has a packing gland or thimble $n$ encircling the stationary steam pipe $i$ and adapted to form a steam-tight connection while permitting rotation of the hollow, journaled portion and the roll with respect to the steam pipe.

A water outlet pipe or siphon $o$ also extends into the heating chamber $h$ of each roll, with its inner end $p$ extending downward below the axial center of the roll and near to the bottom of the heating chamber in position to enable water to be drawn from the heating chamber, as indicated by Fig. 2. The pipe $o$ is shown in the drawing so arranged that it extends through the pipe connection or manifold member $k$ and longitudinally through the steam pipe $i$, thus providing a very desirable and a more compact arrangement than would result from inserting the water pipe or siphon into the opposite end of the roll remote from the steam pipe.

It will be readily seen that any desired number of pairs of rolls may thus be rotatably mounted in parallel relation, and in position to admit and compress a plurality of layers of sheet material therebetween, and the rolls are adapted to be operatively connected with a suitable source of power of any desired, ordinary or well known form, and to be driven or rotated at any desired speed, and so that the rolls will have the desired equal peripheral speed. One or more rolls of each pair of compressing and drying rolls is provided with an adjustable or sliding support $q$ and adjusting mechanism, such as an adjusting screw $r$, whereby such roll or rolls may be adjusted and securely held in any desired adjusted position with respect to the next adjacent roll, so that the rolls of each pair are spaced apart and the width of the space between the rolls, and through which the layers or plies to be adhesively secured together are to pass, may be controlled and regulated or increased and diminished as desired. Each of the rolls is provided with a circular endwise projecting portion or hub $s$, which extends endwise or longitudinally of the roll beyond the main body portion thereof, and a retaining plate or end shield $t$, formed preferably of metal, is mounted at each end of each pair of rolls. Each of these plates or shields is provided with a curved marginal edge portion $u$, as indicated in broken lines in Fig. 4, adapted to engage the adjacent circular peripheral surface portion $v$ of the hub $s$ of each of the rolls, between the ends or hubs of which such plate extends. The plates or shields are in snug contact with the hubs and with the end surface portions $w$ of the rolls from a point directly between or below the axial centers of the rolls to a point sufficiently above the level of the axial centers of the rolls to prevent adhesive material in heated, plastic or liquid condition from flowing out endwise of the rolls or from between the layers or plies of sheet material during the passage of said layers or plies, with the interposed adhesive material, between the rolls, in the process of uniting and compressing and sealing the marginal edges of the layers or plies.
In practice the compression rolls of each pair are, by preference, mounted in such position that their axial centers are in the same, or approximately the same, horizontal plane and parallel, and the plates or shields $t$ are, by preference, of such diameter as to extend upward and outward from a point between the axial centers of the rolls, as already suggested, to or beyond the upper or outer extremities of the hubs $s$.
(See Figs. 1, 2 and 4.) Supply pipes $y$, connected with a suitable supply of adhesive material by means of a manifold or main supply pipe $z$, are mounted in position to continuously supply and introduce adhesive or binding material in a liquid or plastic condition between the layers or plies of sheet material and between the plates $t$ during the passage of the layers or plies of sheet material and of the adhesive material between the rolls in the process of compressing and heating the material to be operated upon.

The rolls $d$ of each pair of compression and heating rolls are spaced apart, as already suggested, and are of such construction that the space 2 between the rolls, and through which the layers or plies to be united are to pass, is narrower at each longitudinal extremity of the rolls, at the points indicated by the numeral 5 in Figs. 2 and 3, than it is at points between said extremities throughout the length of the rolls. In order to accomplish this in a simple and efficient manner, at least one of each pair of rolls $d$ is provided at or near preferably both ends with a margin-compressing annular shoulder or rim 3 of greater diameter than the cylindrical periphereal portion 4 of the main body of the roll or rolls and projecting peripherally beyond the cylindrical peripheral surface portion 4, or main body portion of the roll on which such rim or rims are formed. These peripherally projecting marginal portions or rims are, by preference, both on the same roll and at or near the opposite end margins or extremities of such roll, as shown in Figs. 2 and 3, and extend more closely to the adjacent peripheral surface of the next adjacent roll than does the cylindrical surface portion or main body portion 4 of the roll on which the shoulders or rims are formed. The space between the parts 3 and the adjacent peripheral surface of the adjacent roll is, therefore, narrower than the space between the adjacent cylindrical main body portions 4 of the rolls. The peripherally projecting parts or annular rims 3 are exaggerated as to height or extent to which they project peripherally beyond, or exceed in diameter the main cylindrical or intermediate body portion of the roll on which they are formed, in order that they may be distinguishable in the drawing. In practice they may project approximately three or four thousandths of an inch peripherally beyond the adjacent peripheral surface of the main body of the roll, although the distance which they project may be greater or less, as required. The layers or plies of sheet material passing through the space 2 and between the rolls $d$ are of substantially uniform thickness throughout their entire area before being compressed between the rolls, and their longitudinal marginal portions pass between the annular shoulders or relatively large, peripherally projecting rims 3 and the adjacent roll. Said marginal portions of the layers are thus subjected to a greater degree of pressure than the portions of the layers passing between the intermediate or cylindrical main body portions 4 of the rolls. The longitudinal marginal portions of the layers or plies forming the multi-layer sheet are sealed together in an efficient manner by being thus compressed and subjected to the action of sufficient heat to maintain the adhesive material in a plastic condition during compression. The adhesive material is thus caused to permeate the material of which the layers are formed and the action of the heat tends to quickly dry the adhesive material and the sealed marginal edges of the sheet or layers.

By compressing the layers of sheet material together, with their longitudinal edges not quite flush with each other, or with the edge 6 of one layer slightly overlapping or extending laterally slightly beyond the adjacent edge 7 of the next adjacent layer or layers, as indicated in Fig. 3, the edge portion 7 or overlapped edge is embedded or partially embedded in the layer having the projecting or outermost overlapping edge portion 6. The edges are thus very tightly sealed, and leakage of the adhesive material is prevented or reduced to a minimum by the close contact of the overlapping and embedded longitudinal marginal portions or edges thus compressed together and sealed.

I claim:

1. The process of making sealed-edged sheets formed of a plurality of united layers of sheet material, which consists in introducing adhesive material in plastic condition between the layers to be united, and compressing the layers together and the longitudinal margins of said layers into contact and sealed engagement with each other by applying pressure thereto progressively from end to end thereof, the degree of pressure to which the longitudinal marginal portions of the layers are subjected being in excess of the degree of pressure to which the portions of the layers located intermediate said longitudinal marginal portions are subjected, substantially as described.

2. The process of making sealed-edged sheets comprising a plurality of layers of sheet material, which consists in introducing adhesive material in plastic condition between the layers to be united, compressing the layers together and embedding the lateral marginal edge of one of said layers in and in sealed contact with the corresponding lateral margin of the other layer on each side of the longitudinal center of the connected layers and simultaneously subjecting the layers and the adhesive material located between the layers to a degree of heat sufficient to maintain the adhesive material in plastic condition during compression, substantially as described.

3. A sealed-edged sheet, consisting of a plurality of layers of fibrous material, and an intermediate layer of adhesive material between and adhesively uniting said layers of sheet material, said layers of sheet material having sealed longitudinal edge portions which are more compact than the portion of the layers of sheet material located intermediate the sealed edges, said relatively more compact longitudinal edge portions being in contact and sealed engagement with each other throughout the length of the sheet.

4. A sealed-edged sheet consisting of a plurality of layers of fibrous material, and an intermediate layer of adhesive material between and adapted to adhesively unite the same, said layers of fibrous material comprising a layer having a side marginal portion which projects laterally beyond the corresponding side edge of the next adjacent layer, and said side edge of said last mentioned layer being embedded in and in sealed engagement with the adjacent marginal portion of said first mentioned layer, the sealed-edged portions being more compact than the remaining portions of the layers.

In testimony that I claim the foregoing as my invention I affix my signature in the presence of two witnesses, this 19th day of September, A. D. 1914.

GEORGE H. SMITH.

Witnesses:
EUGENE C. CAFFREY,
CHAS. M. HACK.